Nov. 18, 1952     R. M. SMITH     2,618,430
REFRIGERATING APPARATUS

Filed July 24, 1948     6 Sheets-Sheet 1

INVENTOR.
ROLF M. SMITH.
BY
Spencer, Hardman & Fehr

Nov. 18, 1952 — R. M. SMITH — 2,618,430
REFRIGERATING APPARATUS
Filed July 24, 1948 — 6 Sheets-Sheet 2

INVENTOR.
ROLF M. SMITH.
BY
Spencer, Hardman & Fehr.

Nov. 18, 1952  R. M. SMITH  2,618,430
REFRIGERATING APPARATUS
Filed July 24, 1948  6 Sheets-Sheet 4

INVENTOR.
Rolf M. Smith.
BY
Spencer, Hardman & Fehr.

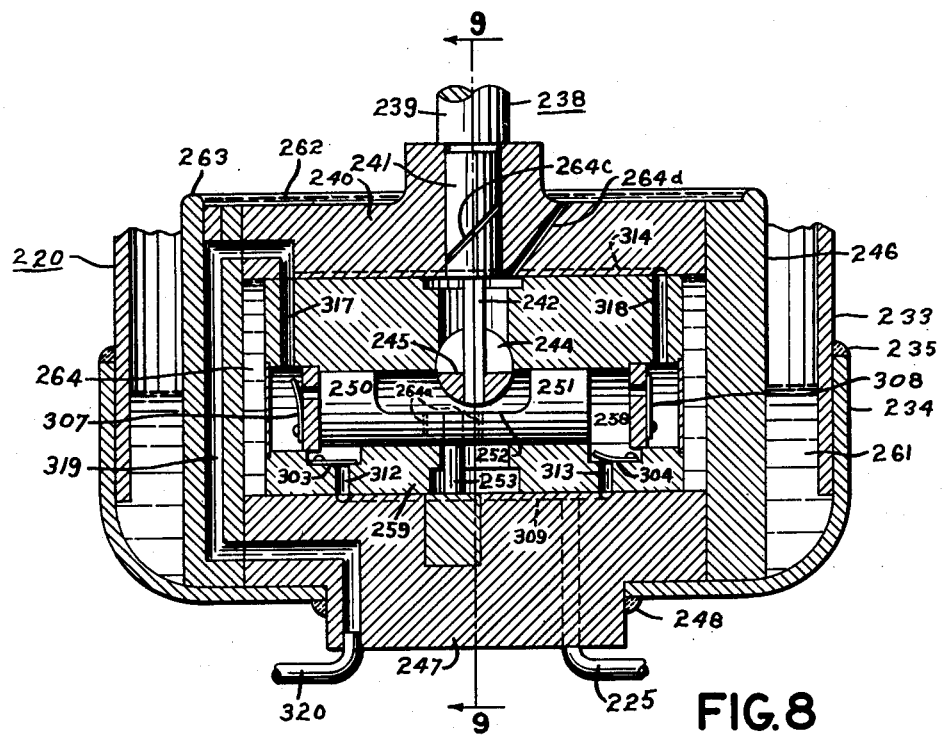

INVENTOR.

BY Rolf M. Smith.

Spencer, Hardman & Fehr.

Patented Nov. 18, 1952

2,618,430

UNITED STATES PATENT OFFICE 2,618,430

REFRIGERATING APPARATUS

Rolf M. Smith, Dayton, Ohio, assignor to General Motors Corporation, Dayton, Ohio, a corporation of Delaware Application July 24, 1948, Serial No. 40,441

2 Claims. (Cl. 230—58)

This invention relates to refrigerating apparatus.

An object of this invention is to provide a motor-compressor unit with an improved type of rotating compressor.

Further objects and advantages of the present invention will be apparent from the following description, reference being had to the accompanying drawings, wherein a preferred form of the present invention is clearly shown.

Figure 1:
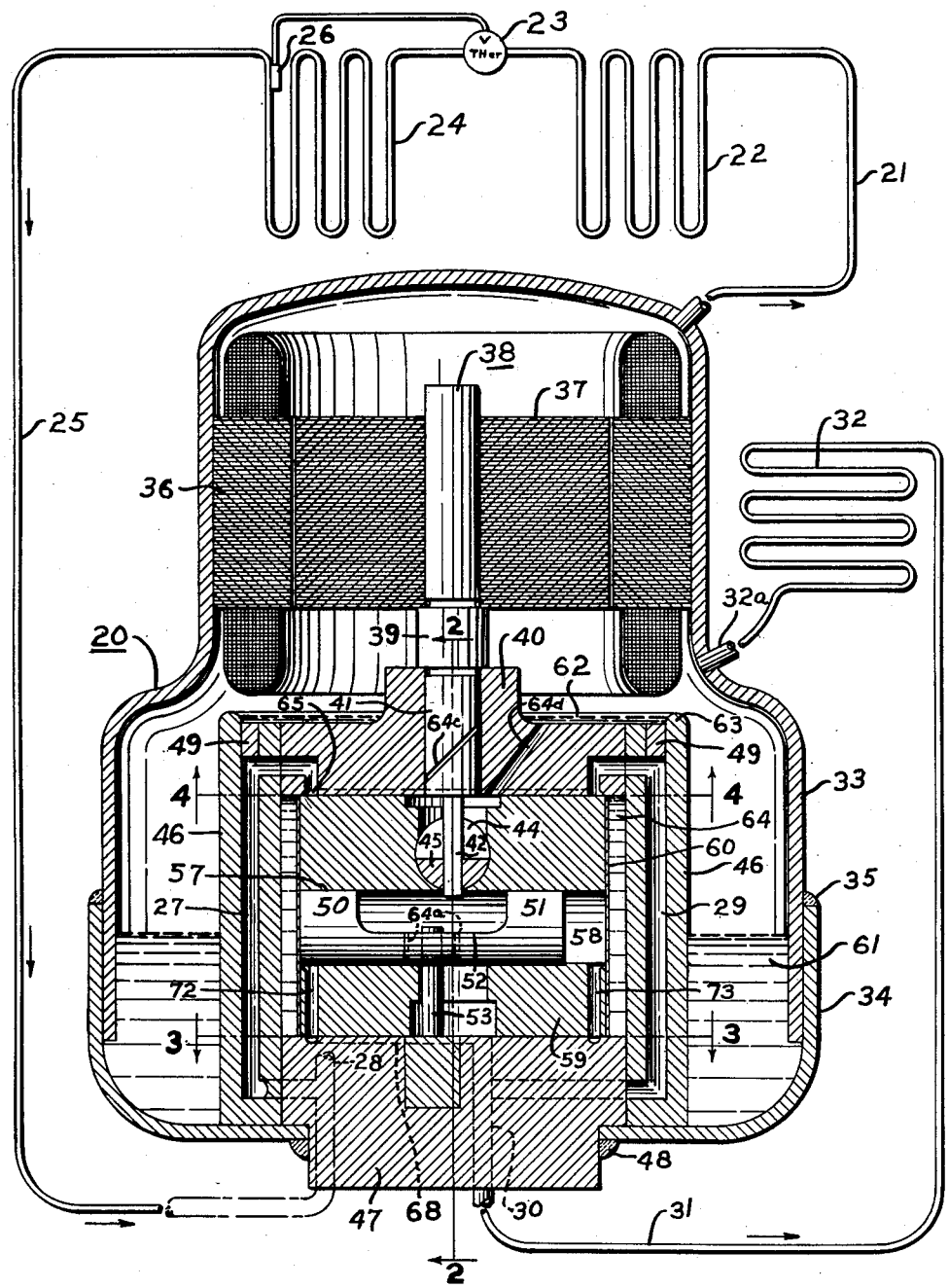
Fig. 1 is a vertical cross-sectional view of the motor-compressor unit, with the remainder of the refrigerating system shown diagrammatically.
Figure 3:
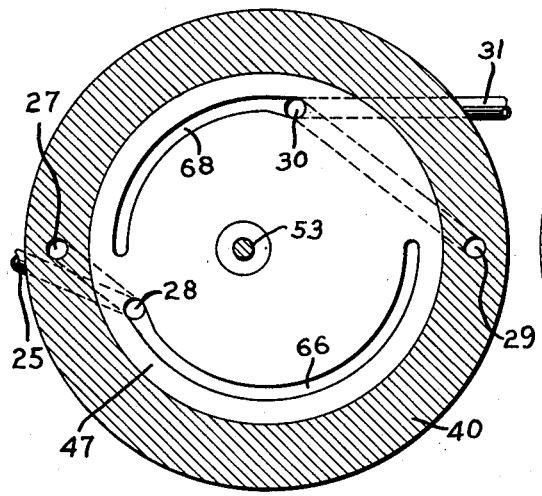
Figure 4:
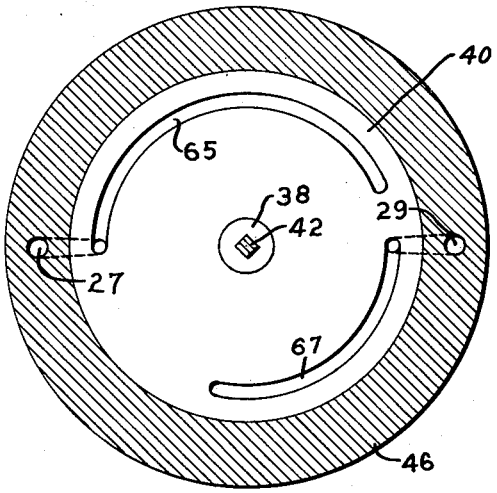
Figure 2:
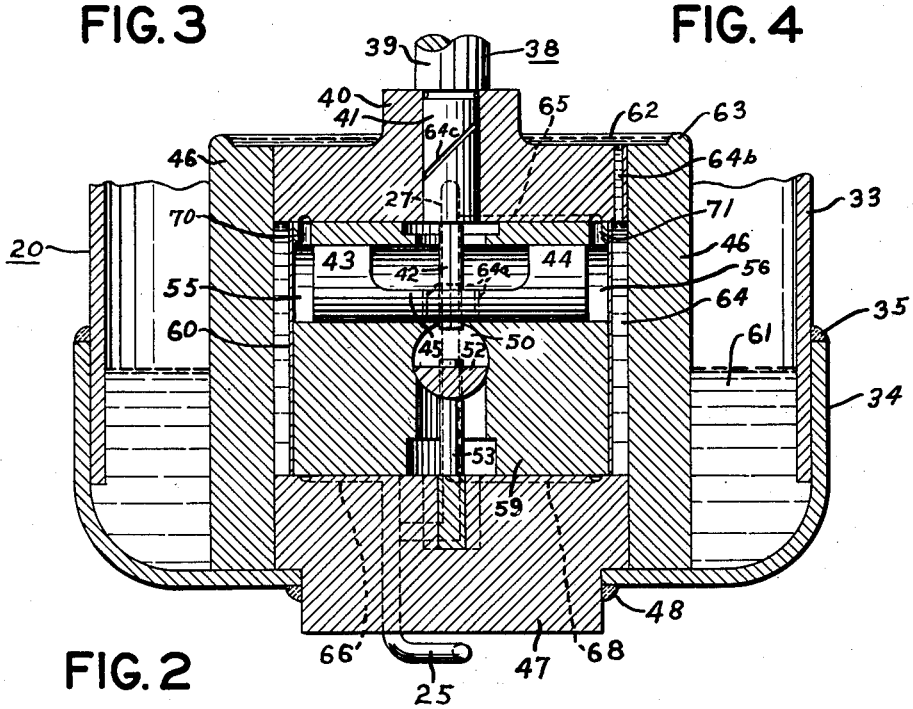
Fig. 2 is a view taken along the line 2—2 of Fig. 1.
Figure 5:
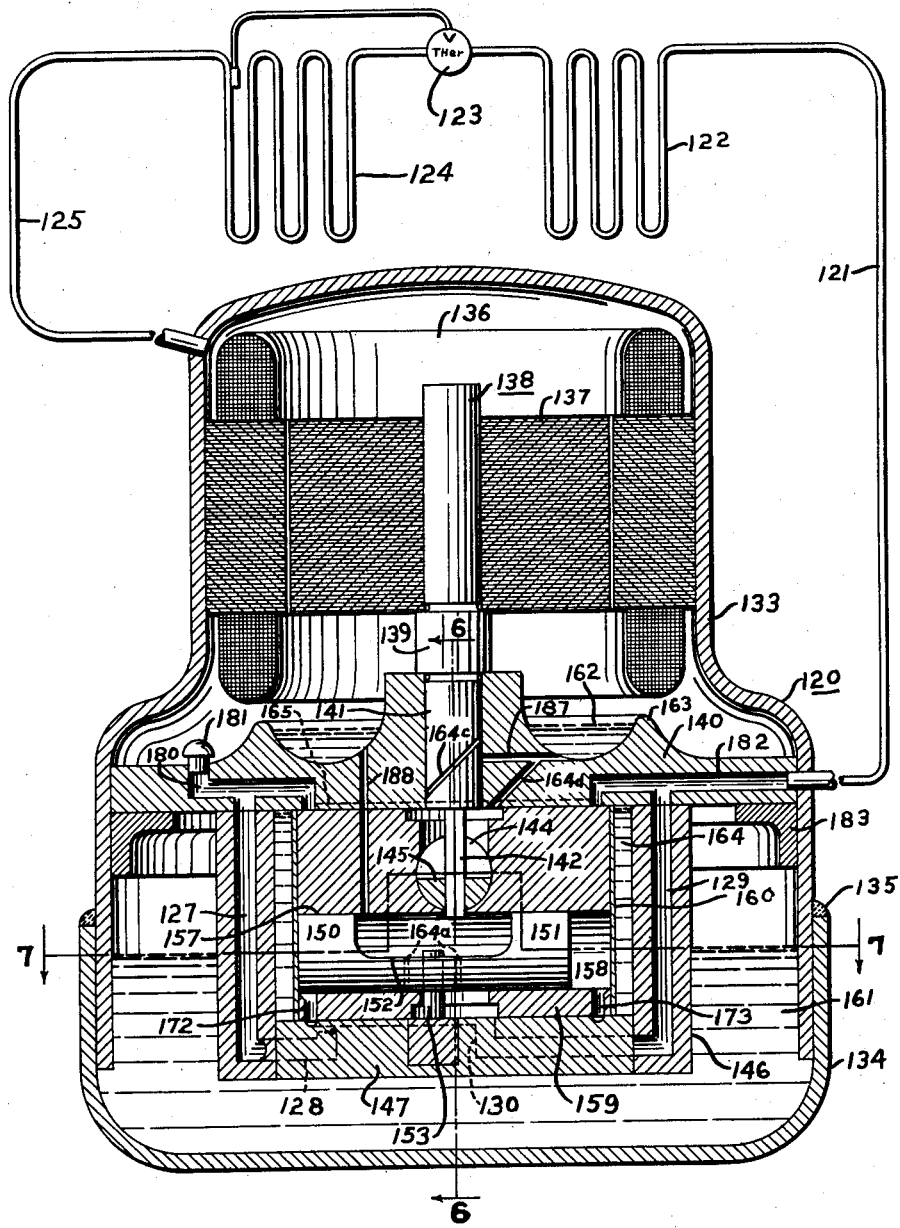
Figure 6:
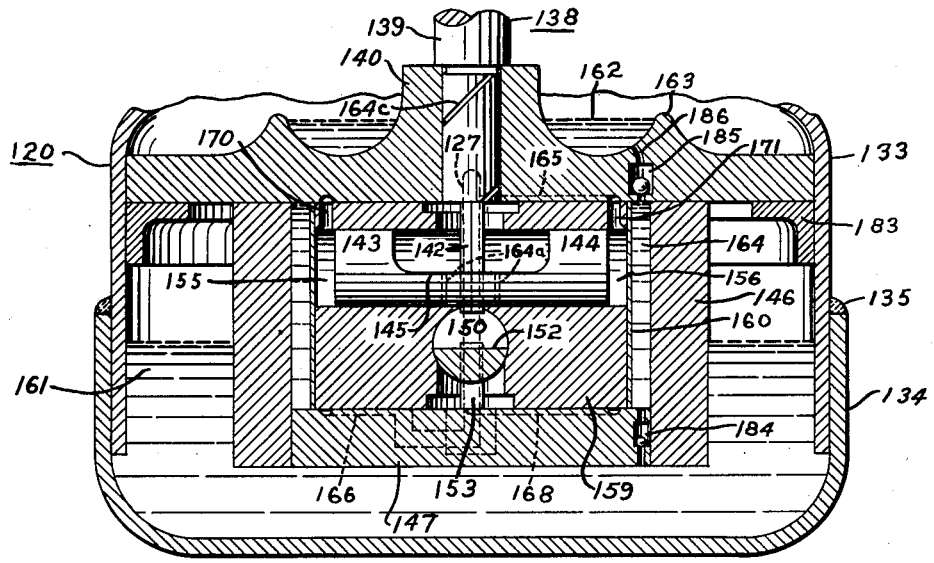
Figure 7:
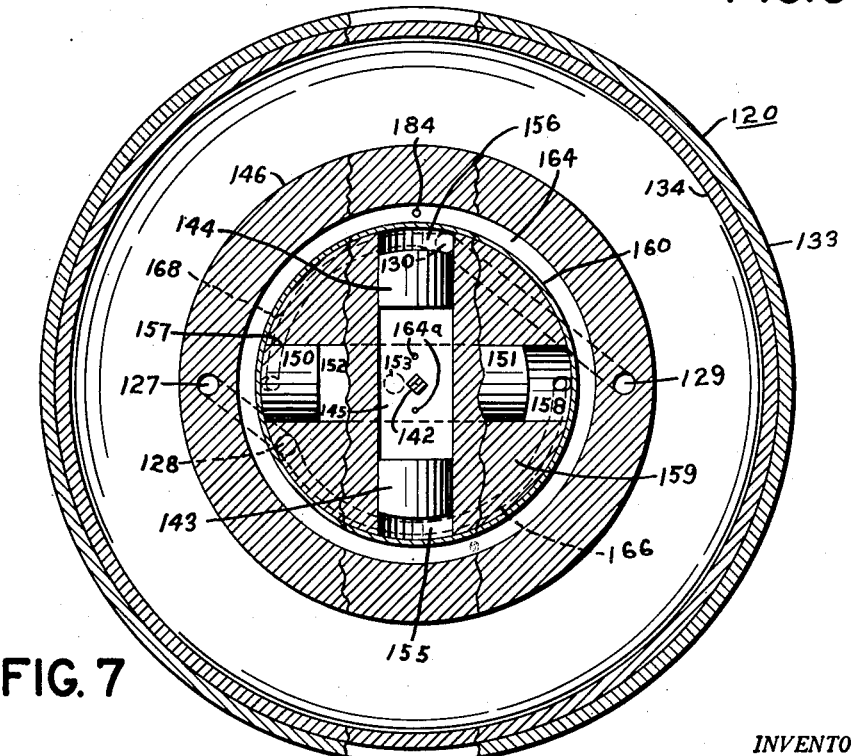

Figs. 3 and 4 are views taken respectively along the lines 3—3 and 4—4 of Fig. 1;

Fig. 5 is a view, similar to Fig. 1, showing a modified form of the invention;

Figs. 6 and 7 are views taken respectively along the line 6—6 and 7—7 of Fig. 5;

Fig. 8 is a vertical cross-sectional view of the lower part of a motor-compressor unit, showing a further modification of the invention;

Fig. 9 is a view along the line 9—9 of Fig. 8; and

Figs. 10 through 17 are horizontal cross-sectional views taken along broken planes adjacent the pistons of the compressor and showing varying positions of the pistons and cylinders as the compressor rotates.

In the modification shown in Figs. 1 to 4 and 10 to 17, a motor-compressor unit 20 compresses refrigerant, and discharges it through pipe 21 to a condenser 22. The refrigerant flows past an expansion device, such as a thermostatic expansion valve 23, through the evaporator 24 and pipe 25 back to the motor-compressor unit 20. The valve 23 may be provided with a thermostatic bulb 26, which cooperates with the valve 23 to maintain the evaporator 24 in the desired flooded condition, and tends to prevent liquid refrigerant from being discharged into the return pipe 25. The uncompressed refrigerant enters the compressor from the pipe 25 into the intake manifolds 27 and 28 and is discharged in compressed form into the manifolds 29 and 30, from whence it flows through the pipe 31, to super-heat removing coil 32 and connecting nipple 32a back into the motor-compressor unit 20.

The motor-compressor unit 20 may include an upper metallic casing or dome 33 and a lower metallic casing or cup 34, suitably welded together at 35. The dome 33 carries a motor stator 36, having a press-fit in the dome 33, and in which the motor rotor 37 rotates. The rotor 37 is keyed to and carried by a shaft 38 having an enlarged portion 39 which positions the rotor 37 on the shaft 38 and positions and supports the shaft 38 on the upper plate 40 of the compressor. The shaft 38 has an extension 41 which rotates in a bearing in the plate 40. The shaft 38 also has a keyed or rectangularly shaped extension 42 which rotationally fixes it with respect to the aligned pistons 43 and 44, where they are joined together by the bridge 45 (see Fig. 2). The bridge 45 is shown cut away to promote the flow of oil within the compressor; but it is understood that the bridge 45 may be completely cylindrical, so that the pistons 43 and 44 and bridge 45 may form a solid continuous cylindrical piece, if desired. Rotation of the shaft 38 causes horizontal rotation of the pistons 43 and 44 about a vertical axis passing through the center of shaft 38.

The plate 40 is tightly fitted and secured within a stationary vertical compressor housing 46, which, in turn, is tightly fitted and secured over a lower compressor plate 47, which may be welded, at 48, to the lower casing or cup 34. If desired, the housing 46 may be cylindrical in shape, although this is not necessary. The manifolds 27 and 28 may be bored into the walls of the housing 46 from above and may be closed by plugs 49.

A second set of aligned pistons 50 and 51 are joined by a bridge 52 (see Fig. 1). The bridge 52 is also shown cut away; but may also be cylindrical and may form a continuous cylindrical piece with the pistons 50 and 51. The pistons 43 and 44 are at right angles to the pistons 50 and 51. The pistons 43 and 44 are also shown as being in a plane above that of pistons 50 and 51; but they may be in the same plane, if the cut away bridges 45 and 52 are matched together. The pistons 50 and 51 rotate about the central axis of pin 53, which is fixed on plate 47. The central axis of pin 53 is offset from that of shaft 38, as is shown in Fig. 1.

The pistons 43, 44, 50 and 51 reciprocate within and relatively to compressor cylinders 55, 56, 57 and 58 respectively. These cylinders are carried by a cylinder supporting block 59, which rotates about an orbitally moving vertical axis, as will hereafter be more apparent. The block 59 is shown as cylindrical in shape; but it may be of any shape capable of maintaining the compressor cylinders 55, 56, 57 and 58 relatively fixed to each other; but free to rotate about the aforesaid orbitally moving axis. The compressor cylinders 55, 56, 57 and 58 may be sealed at their outer ends by any suitable means, here shown as a cylindrical cover 60, although each compressor cylinder may be sealed by individual covers, if desired.

Lubricant may be placed in the motor-compressor casing. The main body of lubricant is indicated at 61. Another body of lubricant is indicated at 62 where it may be collected as it is separated from the gaseous refrigerant. A cup may be formed by lip 63 to provide a reservoir for holding lubricant body 62. Another body of lubricant is shown at 64, in the space between the housing 46 and the cover 60. The lubricant is free to flow through the various lubricant passages 64a, 64b, 64c and 64d and is carried by the refrigerant from place to place, as is evident.

Figure 10:
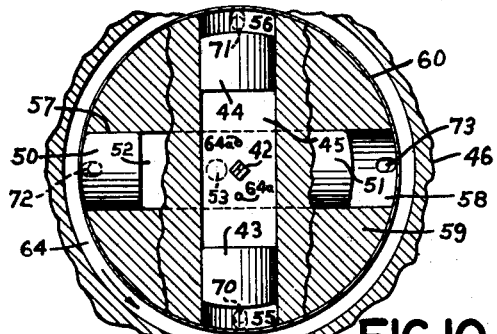
Figure 14:
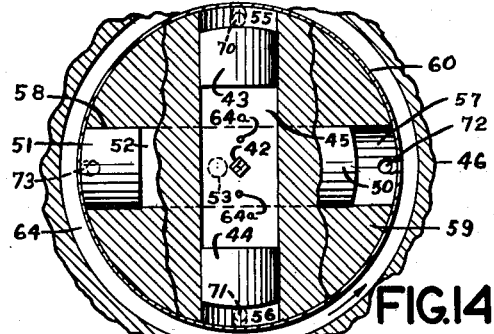
Figure 11:
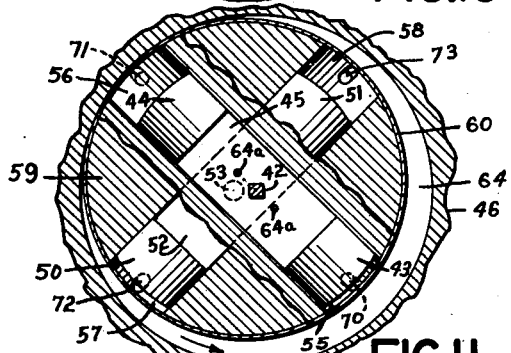
Figure 15:
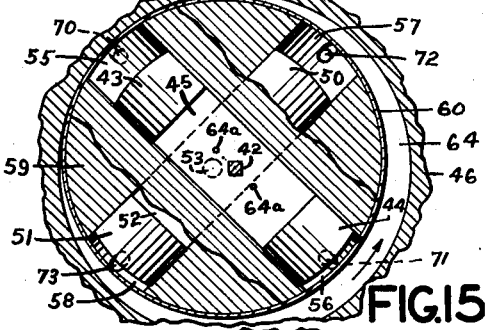
Figure 12:
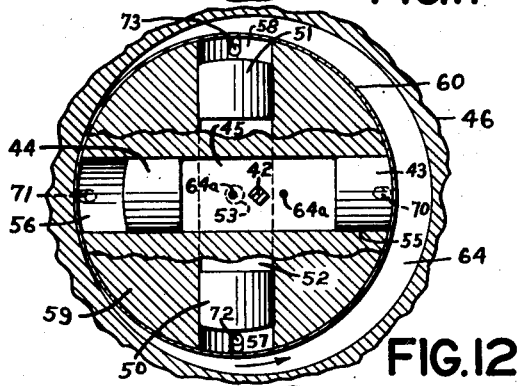
Figure 16:
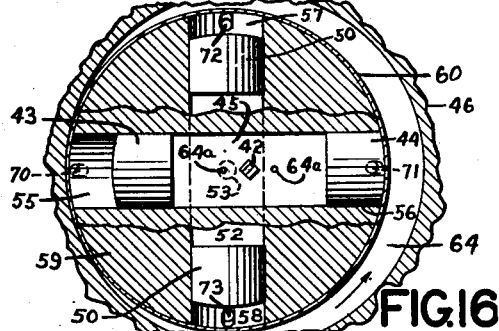
Figure 13:
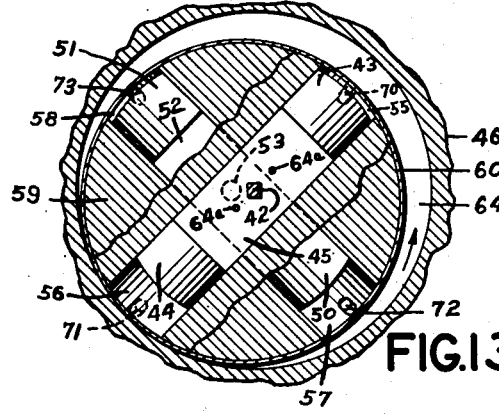
Figure 17:
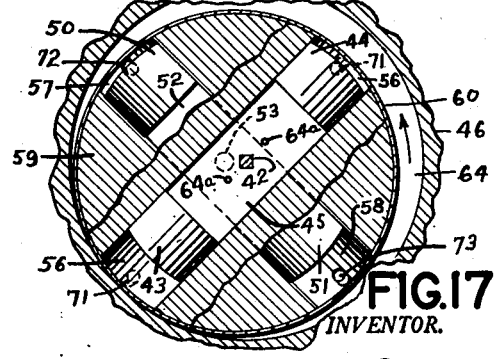

The intake manifold 27 is connected with intake groove 65 (see Figs. 1 and 4). The intake manifold 28 is connected with the intake groove 66 (See Figs. 1 and 3). The discharge manifold 29 is connected with discharge groove 67 (see Figs. 1 and 4). The discharge manifold 30 is connected with discharge groove 68 (see Figs. 1 and 3). The compressor cylinders 55, 56, 57 and 58 have combined intake and discharge ports 70, 71, 72 and 73 respectively, which connect the compressor cylinders, as they rotate, with the grooves 65, 66, 67 and 68. The compressor cylinders 55 and 56 are connected, at times with the grooves 65 and 66, while the compressor cylinders 57 and 58 are connected, at times, with the grooves 67 and 68. The various positions of the compressor pistons 43, 44, 50 and 51, the compressor cylinders 55, 56, 57 and 58, and the cylinder supporting block 59, together with some of the other cooperating parts, are shown in Figs. 10 to 17 inclusive as they rotate about their respective vertical axes. Fig. 10 shows the position of the parts as they stand in Figs. 1 to 4. Figs. 11 to 17 show the parts as they progressively rotate at 45° intervals. Thus it is apparent that compressor housing 46 is stationary, that pistons 43 and 44 rotate about the fixed central axis of shaft extension 42, that pistons 50 and 51 rotate about the fixed central axis of pin 53, and that cylinder supporting block 59 rotates about a moving vertical axis which has an orbital movement within the housing 46.

Piston 50 begins its intake at, or just after, Fig. 10. It has its suction movement through Figs. 11, 12 and 13, and completes its suction stroke in Fig. 14. It has its compression movement through Figs. 15, 16 and 17 and completes its compression movement at, or just before, Fig. 10. The compressing cycles of the other pistons 43, 44 and 51 will be similarly apparent. The suction stroke of piston 51 starts at, or just after, Fig. 14. The suction stroke of piston 43 starts at, or just after, Fig. 12. The suction stroke of piston 44 starts at, or just after, Fig. 16. Their respective suction and compression strokes may be successively followed in Figs. 10 to 17, without further description.

In the operation of the modification shown in Figs. 1 to 4 and 10 to 17, inclusive, gaseous refrigerant enters through the pipe 25 to the intake manifolds 27 and 28 and to the intake grooves 65 and 66. The refrigerant is taken into the cylinders 55, 56, 57 and 58 as they rotate past these grooves, due to the relative reciprocating movement of the pistons within the cylinders. The compressed refrigerant is discharged into the compressed refrigerant grooves 67 and 68 as the cylinders 55, 56, 57 and 58 rotate past them. The compressed refrigerant flows from grooves 67 and 68 to discharge manifolds 29 and 30 from whence it flows through pipe 31 to superheat removing coil 32 and back into the casing 33, 34, through the nipple 32a. The cooled compressed refrigerant, with much of the lubricant removed, flows between the motor stator 36 and rotor 37 (or through openings in or about either of them) into the upper part of casing 33, from whence it flows through pipe 21 to condenser 22, where it is liquefied, and from whence it flows past expansion valve 23 into evaporator 24, from whence it flows in gaseous form into pipe 25 and back to the motor-compressor unit.

The lubricant partially mixes with the refrigerant, either mechanically or by solution, in certain parts of the motor-compressor unit, and is partially separated from the refrigerant at other parts of the unit. The lubricant forms bodies 61, 62 and 64 where it is separated and gathered by mechanical and cooling action, as it flows with the refrigerant. The refrigerant and lubricant may be any desired and suitable substances. For example, the refrigerant may be a suitable chlorofluoro derivative of an aliphatic hydrocarbon, such as $CCl_2F_2$, and the lubricant may be a mineral oil, with which the refrigerant is completely miscible. Also the refrigerant may be an inorganic substance, such as $SO_2$ together with any suitable lubricant, such as mineral oil. These are given by way of example, and may be varied, if desired.

In the modification shown in Figs. 5, 6 and 7 the parts which correspond substantially in structure and function with those of Figs. 1 to 4 and 10 to 17 inclusive, are indicated with the same numerals, but with 100 added. It is to be understood that, when so numbered, these parts have substantially the same structure, function and mode of operation, so far as is consistent with the showing in the drawings. These parts are not herein repetitiously described; but, instead, the description is limited to those parts which are more or less different.

The main difference in the modification of Figs. 5, 6 and 7 is that the refrigerant in casing 133, 134 is uncompressed refrigerant, whereas in Figs. 1 to 4 it is compressed refrigerant. Thus, in Figs. 5, 6 and 7 uncompressed refrigerant enters casing 133, 134 from the pipe 125, passes down between, or through stator 136 and rotor 137 and enters through the compressor intake 180 having a muffler or oil separator 181. From thence it passes to intake manifolds 127 and 128 to the intake grooves similar to intake grooves 65, 66. The refrigerant is then compressed in cylinders 155, 156, 157 and 158 by compressor action substantially the same as in the previously described structure shown in Figs. 1 to 4 and 10 to 17 of the drawings. The compressed refrigerant is discharged into discharge grooves similar to grooves 67, 68 from whence it flows to discharge manifolds 129, 130, through passage 182 in upper plate 140, from whence it flows to pipe 121, condenser 122, thermostatic expansion valve 123, evaporator 124 and pipe 125 back to the interior of the compressor unit.

The compressor plate 140 is of greater diameter than the stationary vertical compressor housing 146 and is supported on a ring 183 which is welded or press-fitted into casing 133. The housing 146 is secured to the plates 140 and 147 in any conventional or well known manner. The plate 147 is not secured to the cup 134 as shown in Fig. 1. Plate 140 is provided with an oil cup formed by lip 163. In this modification the lubricant from body 161 passes through check valve 184 into body 164 and from thence past check valve 185 and groove 186 into body 162 (see Fig. 6), from whence it flows through grooves 164d and 187 (see Fig. 5) to the pistons 143 and 144 and shaft 138. Another groove 188 (see Fig. 5) feeds the pistons 150 and 151. The lubricant is forced through the check valves 184 and 185 by the surging action of the cylinder block 159 within the housing 146.

The modification shown in Figs. 8 and 9 is numbered the same as in Figs. 1 to 4 and 10 to 17 inclusive, except that 200 has been added to parts which correspond substantially to those in Figs. 1 to 4 and 10 to 17. Where greater differences occur, numerals above 300 are used. The main difference in this modification is that the compressor cylinders 255, 256, 257 and 258 are provided with intake check valves 301, 302, 303 and 304 respectively, and with discharge check valves 305, 306, 307 and 308 respectively. The intake check valves are supplied with uncompressed refrigerant from intake groove 309 through intake passages 310, 311, 312, 313 respectively. The intake groove 309 is connected to uncompressed refrigerant pipe 225 leading from an evaporator corresponding to 24. The discharge check valves 305, 306, 307 and 308 are connected to discharge groove 314 through discharge passages 315, 316, 317 and 318. The groove 314 is connected to passage 319 and from thence to discharge pipe 320, which corresponds either to pipe 31 leading to a super-heat removing coil, such as 32, or directly to a condenser, such as 22. Another difference in this modification is that the pistons 243, 244 are almost in the same horizontal plane as pistons 250, 251. This is made possible by the cut away portion of bridge 252 of pistons 250 and 251 receiving the bridge portion 245 of pistons 243 and 244. If the cut away portion of bridge 245 of pistons 243 and 244 is inverted, then all of the pistons 243, 244, 250 and 251 may be placed entirely in the same horizontal plane, if desired.

While the form of embodiment of the invention as herein disclosed, constitutes a preferred form, it is to be understood that other forms might be adopted, as may come within the scope of the claims which follow.

What is claimed is as follows:

1. In combination, two substantially cup-shaped members secured together to form a closed casing having an upper chamber and a lower chamber therein, said members providing the sole means of supporting an electric motor and a compressor within said casing, an electric motor including a stator secured to the upright wall of one of said members in said upper chamber and having a rotor within said stator, a sealed compressor within the lower chamber of said casing including a closed stationary housing secured to and supported upon the bottom wall of the other of said members, said upper and said lower chambers being in open communication with one another, a drive shaft depending from said rotor, said drive shaft being supported upon said compressor housing and having a part thereof extending thereinto, a pair of aligned pistons in said housing secured to said shaft to rotate therewith and about the axis thereof, a second pair of aligned pistons in said housing mounted to rotate about an axis parallel to and offset from the axis of said shaft, cylinders about said pistons disposed one above the other, said cylinders being fixed with respect to each other and free to rotate as a body about a body axis parallel to said shaft and said body axis moving about an orbit within said housing, said housing including a top having a lubricant reservoir provided therein, a passageway extending through said top from the bottom of said reservoir and communicating with the interior of said housing for conducting lubricant directly from the reservoir into contact with the cylinders of at least said first named pair of pistons, and the open communication of said upper chamber with said lower chamber permitting lubricant to overflow the reservoir and drop to the bottom of said other of said members.

2. In combination, two substantially cup-shaped members secured together to form a closed casing having an upper chamber and a lower chamber therein, said members providing the sole means of supporting an electric motor and a compressor within said casing, an electric motor including a stator secured to the upright wall of one of said members in said upper chamber and having a rotor within said stator, a sealed compressor within the lower chamber of said casing, including a closed stationary housing secured to and supported upon the bottom wall of the other of said members, said upper and said lower chambers being in open communication with one another, a drive shaft depending from said rotor said drive shaft being supported upon said compressor housing and having a part thereof extending thereinto, said housing having a cylindrical bore therein with its axis aligned with the axis of said shaft, a cylindrical block in the bore of said housing, said block having cylinders therein disposed one above the other and at right angles to one another, a pair of pistons within one of the cylinders of said block and secured to said shaft to rotate therewith about the axis thereof, a second pair of pistons within another of the cylinders of said block and mounted to rotate about an axis parallel to and offset from the axis of said shaft, said cylindrical block having its axis parallel to said shaft and being movable about an orbit within said bore, said housing including a top having a lubricant reservoir provided therein, a passageway extending through said top from the bottom of said reservoir and communicating with the bore in said housing for conducting lubricant directly from the reservoir into contact with one of the cylinders in said block, and the open communication of said upper chamber with said lower chamber permitting lubricant to overflow the reservoir and drop to the bottom of said other of said members.

ROLF M. SMITH.

REFERENCES CITED

The following references are of record in the file of this patent:

UNITED STATES PATENTS

| Number | Name | Date |
|---|---|---|
| 1,614,676 | Kercher | Jan. 18, 1927 |
| 1,781,082 | Ruegger | Nov. 11, 1930 |
| 1,867,198 | Waite | July 12, 1932 |
| 2,065,162 | Trask | Dec. 22, 1936 |
| 2,178,425 | Johnson | Oct. 31, 1939 |
| 2,248,452 | Erickson | July 8, 1941 |
| 2,503,257 | Graham | Apr. 11, 1950 |
| 2,545,600 | Berry | Mar. 30, 1951 |

FOREIGN PATENTS

| Number | Country | Date |
|---|---|---|
| 375,985 | Germany | July 23, 1922 |